United States Patent
Grand et al.

(10) Patent No.: US 7,190,145 B2
(45) Date of Patent: Mar. 13, 2007

(54) METHOD AND APPARATUS FOR IMPROVING SPEED MEASUREMENT QUALITY IN MULTI-POLE MACHINES

(75) Inventors: Kerry E. Grand, Chesterfield, MI (US); Richard J. Hampo, Plymount, MI (US); Yifan Zhao, Belleville, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 433 days.

(21) Appl. No.: 10/334,198

(22) Filed: Dec. 30, 2002

(65) Prior Publication Data

US 2003/0164692 A1      Sep. 4, 2003

Related U.S. Application Data

(60) Provisional application No. 60/319,066, filed on Jan. 16, 2002.

(51) Int. Cl.
 *G01P 3/481* (2006.01)
 *G01P 3/66* (2006.01)
 *H02P 6/08* (2006.01)

(52) U.S. Cl. .................. 318/721; 318/138; 318/254; 318/439; 318/490; 324/173; 324/179

(58) Field of Classification Search ............... 318/439, 318/721, 138, 254, 432, 599, 600, 601, 362, 318/368, 702; 388/811, 802, 815
See application file for complete search history.

(56) References Cited

U.S. PATENT DOCUMENTS

| | | | | |
|---|---|---|---|---|
| 4,131,828 A | * | 12/1978 | Houshi | 318/138 |
| 4,358,723 A | * | 11/1982 | Scholl et al. | 318/661 |
| 4,600,866 A | * | 7/1986 | Seto | 318/138 |
| 4,660,021 A | * | 4/1987 | Leiby | 341/11 |
| 4,667,297 A | * | 5/1987 | Kawai | 324/160 |
| 5,194,794 A | | 3/1993 | Shamoto | 318/603 |
| 5,220,257 A | | 6/1993 | Yoshino et al. | 318/254 |

(Continued)

OTHER PUBLICATIONS

Yonnet, J-P. et al., "Permanent Magnet Sensors for Angular and Linear Position Measurement," in *Proceedings of the MAG-NET Conference*, Manchester, UK, Jul. 7-9, 2000, pp. 1-12.

(Continued)

*Primary Examiner*—Lincoln Donovan
*Assistant Examiner*—Eduardo Colon Santana
(74) *Attorney, Agent, or Firm*—Seed IP Law Group PLCC (57) ABSTRACT

A method and apparatus for improving speed measurement quality in systems having multi-pole machines is taught. The method compensates for pole misalignment by computing speed based upon moving average techniques. In one embodiment, a moving average speed averaged over a complete interval of rotation is determined, based upon measurements of one or more magnetic pole position sensors for magnetic pole location. In another embodiment, a time interval between two poles is averaged over one or more rotational periods, and the average time interval is used to determine the moving average speed. Computation of the moving average speed reduces errors in speed measurements due to pole misalignment and may provide for smaller control adjustment times for controlling motor speed variability. In one embodiment, the speed measurement system includes a multi-pole rotor, and a controller having a capture timer and a buffer.

37 Claims, 7 Drawing Sheets

U.S. PATENT DOCUMENTS

| | | | |
|---|---|---|---|
| 5,373,206 A * | 12/1994 | Lim | 318/254 |
| 5,444,345 A * | 8/1995 | Jinnai | 318/603 |
| 5,583,411 A | 12/1996 | Kusano et al. | 318/719 |
| 5,650,700 A | 7/1997 | Mutoh et al. | 318/432 |
| 5,650,779 A * | 7/1997 | Sugden | 318/701 |
| 5,864,771 A | 1/1999 | Yokoyama et al. | 701/208 |
| 6,008,619 A | 12/1999 | Murase et al. | 318/811 |
| 6,021,251 A | 2/2000 | Hammer et al. | 388/801 |
| 6,042,281 A * | 3/2000 | Ohtani | 400/279 |
| 6,049,182 A * | 4/2000 | Nakatani et al. | 318/432 |
| 6,081,087 A * | 6/2000 | Iijima et al. | 318/439 |
| 6,100,823 A * | 8/2000 | Copper | 341/7 |
| 6,124,688 A * | 9/2000 | Coles et al. | 318/254 |
| 6,208,109 B1 * | 3/2001 | Yamai et al. | 318/716 |
| 6,225,770 B1 * | 5/2001 | Heinrich et al. | 318/463 |
| 6,329,779 B1 * | 12/2001 | Pimley et al. | 318/445 |
| 6,678,601 B2 * | 1/2004 | Whinnery | 701/49 |
| 6,701,275 B1 * | 3/2004 | Muratomi | 702/145 |
| 2002/0047683 A1 * | 4/2002 | Kawashima | 318/721 |
| 2003/0210006 A1 * | 11/2003 | Kusaka | 318/437 |
| 2003/0222614 A1 * | 12/2003 | Whinnery et al. | 318/461 |
| 2004/0056632 A1 * | 3/2004 | Nakatsugawa et al. | 318/801 |
| 2004/0252142 A1 * | 12/2004 | Struk et al. | 347/2 |

OTHER PUBLICATIONS

Texas Instruments, "Digital Signal Processing Solution for Permanent Magnet Synchronous Motor," *Application Note Literature No. BPRA044*, pp. 1-27, 1997.

Bell Technologies, Inc., "An Introduction to the Hall Effect," pp. 3-21, retrieved from http://www.sypris.com/library/documents/HallSensorCatalog.pdf.

Bell Technologies, Inc., "A Tutorial on Hall Sensors," pp. 1-9, retrieved from http://www.sypris.com/testandmeasure/content.asp?page_id=441.

Motorola Tutorials, "16-Bit Timer Overflow," pp. 1-3, retrieved from http://www.mcu.motsps.com/tutorials/sld040.htm.

* cited by examiner

METHOD AND APPARATUS FOR IMPROVING SPEED MEASUREMENT QUALITY IN MULTI-POLE MACHINES

CROSS REFERENCE TO RELATED APPLICATIONS

This application claims the benefit under 35 U.S.C. § 119(e) of the U.S. Provisional Patent Application No. 60/319,066 filed 16 Jan. 2002, entitled Method And Apparatus For Improving Speed Measurement Quality In Multi-Pole Machines, such application hereby incorporated by reference in its entirety.

BACKGROUND

1. Technical Field

This application is generally related to measurement and control of electric motors, for example, multi-pole permanent magnet machines.

2. Description of the Related Art

An electric motor is an apparatus or machine for producing motion and mechanical effects by the action of electricity. Those having ordinary skill in the art typically recognize three standard or classical motor designations: direct current ("DC") motors with commutators (wound field), synchronous alternating current ("AC") motors and asynchronous AC motors.

One example of synchronous AC motors is the permanent magnet AC synchronous motor. As shown below, the permanent magnet motor is a synchronous motor, and thus the stator frequency and the number of magnetic poles may be used to directly determine motor speed.

As with most motors, the permanent magnet synchronous motor has two primary parts. The mechanically non-moving or stationary part is called the stator, and the mechanically moving or rotating part, usually inside the stator, is called the rotor.

In order to enable a motor to rotate, two fluxes are needed: one from the stator and the other from the rotor. Typically, in an electric motor, at least one flux is generated in the stator which is of opposite polarity and proximate to at least one flux generated in the rotor. Although the stator is mechanically stationary, electromagnetic techniques may be utilized to create a flux which rotates internal to the stator. Although the rotor can move mechanically, the flux of the rotor is often stationary internal to the rotor. Hence, the moving flux internal to the stator cause the rotor to mechanically rotate by attracting the opposite polarity flux which is stationary internal to the rotor.

There are at least two ways to generate rotor flux. One way is to use windings integral with the rotor to generate an electromagnetic field. Another way is to use permanent magnets integral with the rotor which generate a magnetic field, and hence flux.

One common, commercially available, motor is the "three phase" motor, which uses three alternating current waveforms, slightly delayed in time relative to each other to generate the moving flux in the rotor.

As noted, AC electromagnetic techniques are typically utilized in order to generate the at least one moving flux in the stator, and permanent magnet techniques may be utilized to generate the stationary flux in the rotor. One way in which this is done is to construct the stator as an electromagnet made with a winding for each phase of the motor, while permanent magnets may be used for generating rotor flux. In each winding of the stator, current may either flow in a forward or positive direction, or in a reverse or negative direction. As current flows in the forward direction in the stator according to its windings, the rotor is forced to rotate as it tries to align itself with the electromagnetic flux. At a certain point in the rotation, the field is reversed and the rotor continues to turn in an attempt to realign itself with the new, or negative, field orientation. For a three-phase motor, this results in six unique steps or pole alignments. The amount of current flow may be controlled by either pulse width modulation or analog means. The resolution of control actually depends upon the resolution of the positioning feedback device, the current feedback, and the update rate.

As noted, motors typically operate by "dragging," or pulling the stationary fluxes in the rotor with the moving fluxes induced in the stator. Those having ordinary skill in the art will appreciate that in order to do the foregoing effectively, the moving fluxes in the stator are generally controlled to keep those fluxes effectively proximate to the opposite-polarity fluxes in the rotor. Those having ordinary skill in the art will appreciate that in order to effectively do the foregoing, it is helpful to have a good idea of either or both the speed of rotation and positioning of the fluxes inside the rotor.

One way in which either or both the speed of rotation and positioning of the fluxes inside the rotor are determined is via the use of sensors that detect the poles of the magnets stationary within the rotor. For example, multi-pole brushless permanent magnet machines use magnetic pole position sensors, such as Hall effect sensors, to determine the positions of the magnetic poles within the rotor, relative to a fixed position on the stator, so as to control current in the stator winding in order to provide a controlled torque output (e.g., reversing direction of current every half cycle). As used herein, the output of a magnetic pole position sensor constitutes one logic level when it is near a north pole and another logic level when it is near a south pole. Thus, as the poles of the rotor pass near the magnetic pole position sensor, the logic level output alternates from low to high. For a machine with N pole pairs (or N×2 poles), there will be N sequences of low and high logic levels on the output of the magnetic pole position sensor for each mechanical revolution of the stator of the machine.

In this type of system, speed is measured by determining the time difference between the edges of the output signal of the magnetic pole position sensor. This can be done in a variety of ways. The most common way is to measure the time from one rising edge to the next. This time is then multiplied by the number of poles of the machine and inverted giving the rotational speed of the motor. This concept is graphically illustrated with respect to FIG. 2.

Figure 2:
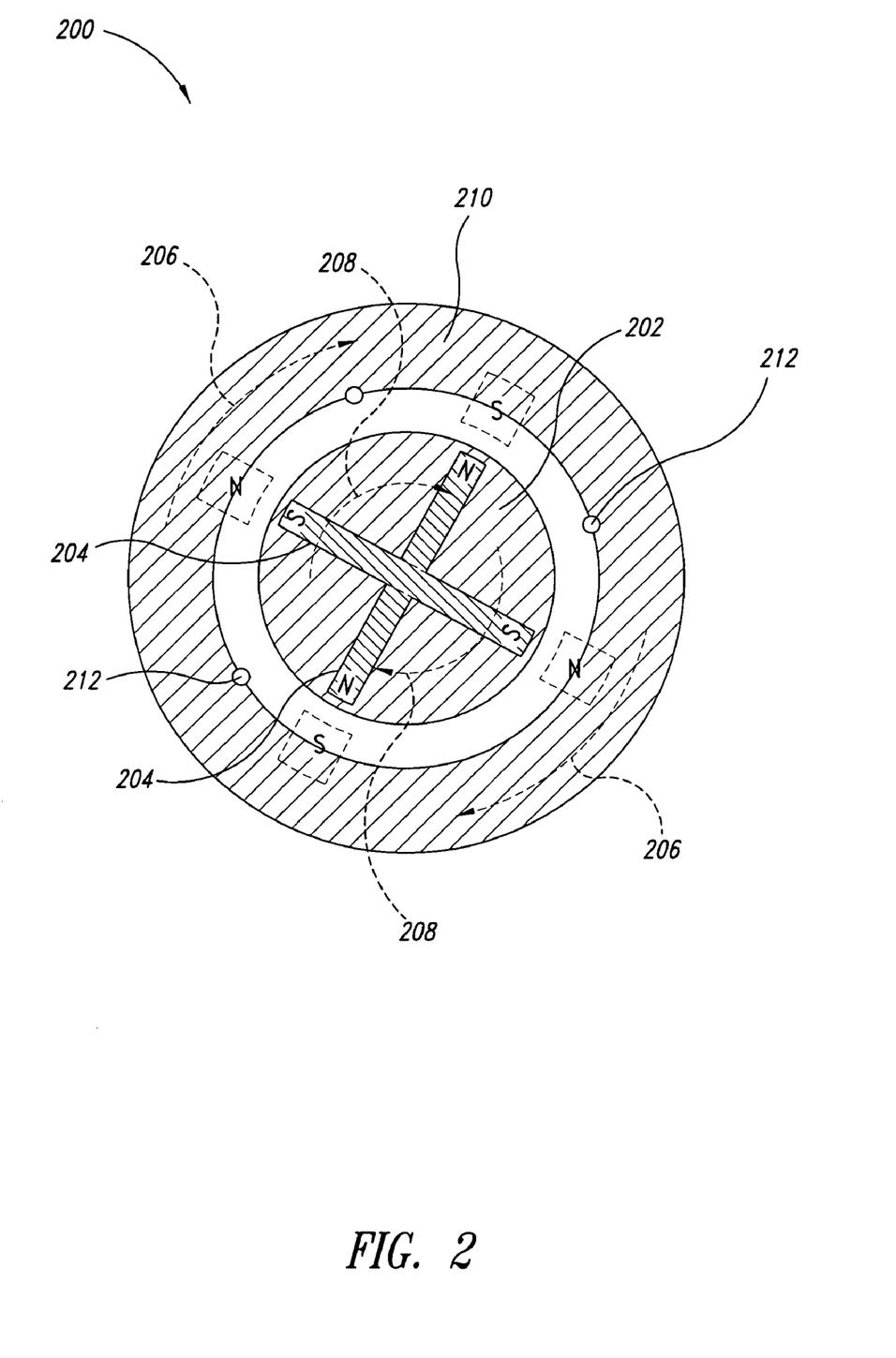
FIG. 2 shows electric motor 200 in cross-section.

FIG. 2 shows an electric motor 200 in cross-section. The electric motor 200 includes a rotor 202 having four poles provided by permanent magnet. Alignment lines 204 illustrate the alignment of the north poles and the alignment of the south poles such that the N-S-N-S poles are equispaced around the rotor 202. Broken directional lines 206 show the manipulation of the currents in the windings (not shown) of stator 210 such that rotating S-N-S-N poles are produced in the stator. Broken directional lines 208 illustrate that the rotating S-N-S-N poles in stator 210 drag their respectively paired N-S-N-S poles in rotor 202 to cause rotation of rotor 202.

A number of rotor-pole sensors 212 (e.g., hall effect sensors) are positioned or proximate the on stator 210. Those skilled in the art will appreciate that, insofar as the N-S-N-S poles in rotor 202 are equispaced, it is common in the art to measure the elapsed time of rotation between successive N-S poles, and then multiply the measured elapsed time of rotation by the number of poles in the rotor to determine the speed of rotation of the rotor. For example, using one of the rotor-pole sensors to detect the elapsed time between successive poles, and thereafter multiplying the measured elapsed time by four, since there are four poles which divide the rotation into 4 equal length arcs.

As has been explained above, in order to provide effective control of a motor, it is important to have an accurate measure of the speed of the motor. It is therefore apparent that a need exists in the art for the motor measurement speed to be accurate.

BRIEF SUMMARY OF INVENTION

In one embodiment, a method for use with multi-pole machines includes detecting a first time at which a first pole passes a first stator position; detecting a second time at which a second pole passes the first stator position; determining an elapsed time between the first and the second times; recalling at least one historical elapsed time between the first and second poles passing the first stator position; calculating an average time based on the elapsed time and the at least one historical elapsed time; and calculating a rotational quantity on the basis of the average time.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

In one embodiment, an apparatus for determining a speed of a multi-pole machine includes at least one magnetic pole position sensor positioned to detect a passing of each pole and configured to provide a pulse in a pulsed signal in response to each passing of each pole; and a controller for measuring a time between a rising edge of one pulse and a rising edge of a next pulse in the pulsed signal and storing a total time from pulse to pulse in one revolution of a motor.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE SEVERAL VIEWS OF THE DRAWING

The same or similar symbols used in drawings generally is intended to indicate similar or identical items.

DETAILED DESCRIPTION OF THE INVENTION

It has been noted by the inventors that manufacturing imperfections and tolerances often cause a variance between the location of the actual physical poles and the desired equispaced theoretical positions illustrated in FIG. 2. It has further been noted by the inventors that the foregoing described speed measurement will have errors if the magnetic poles are not perfectly oriented around the rotor of the motor (i.e., there are variations in the placement of the magnets).

Figure 3:
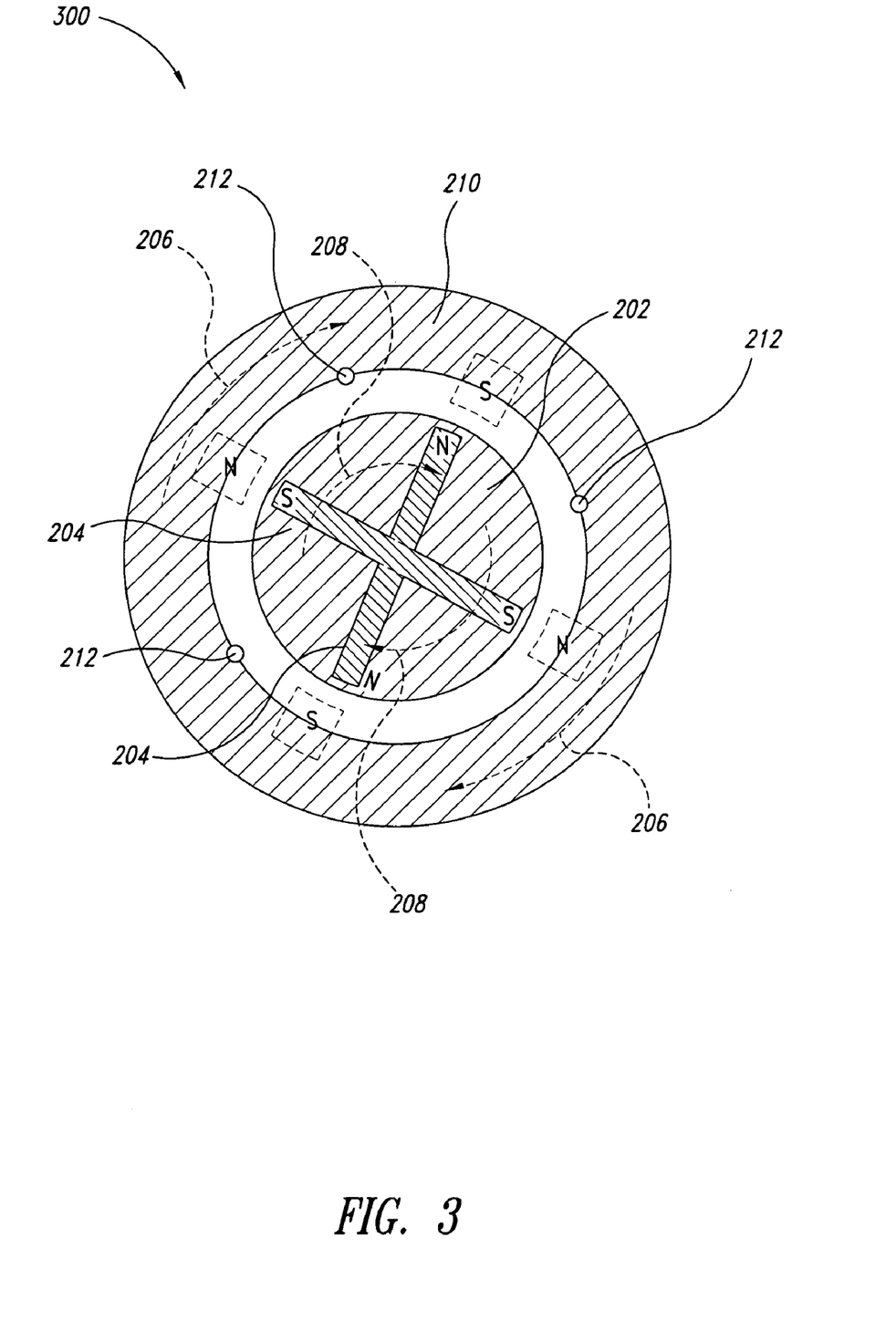
FIG. 3 depicts electric motor 300 in cross-section, which is similar to electric motor 200, but which shows manufacturing variations.

FIG. 3 shows an electric motor 300 in cross-section, which is similar to electric motor 200, but which includes variations introduced by manufacturing. The rotor 202 has four poles provided by permanent magnets. Alignment lines 204 illustrate that while the south poles are aligned, the north poles are misaligned. As a consequence of this misalignment, the N-S-N-S poles are no longer equispaced around rotor 202 as illustrated in FIG. 3.

Insofar as the N-S-N-S poles in rotor 202 are no longer equispaced, the accuracy of rotational speed calculation will tend to be adversely affected. For example, the transition from S to N sensed by one of the rotor-pole sensors 212 will appear longer than it should. This gives rise to an error since the positioning of the misplaced N pole lags relative to the preceding (in rotation) S pole. Accordingly, multiplying the measured elapsed time by four, results in an aggregate error of 4× the initial error in calculating the speed of rotation. Conversely, the transition from N to S subsequently sensed by the same rotor-pole sensor will appear shorter than it should. This gives rise to an error since the positioning of the misplaced N pole relative to the following (in rotation) N pole leads where it should be in the rotational arc. Accordingly, multiplying the measured elapsed time by four, results in an aggregate error of 4× the initial error in calculating the speed of rotation.

The inventors have noted that errors such as those described foregoing can cause disturbances in the control of the motor and, in extreme cases, can destabilize an entire motor system.

As noted in the example of FIG. 3, there is a risk that the rotor poles will not be equispaced as actually built. Thus, in the case of the two phase or four pole machine 300, the edge of a successive pole may not be exactly 180 degrees physically away from the edge of a preceding pole. Consequently, if one is attempting a position measurement based upon the edges of the successive poles, an oscillation error will occur (e.g., in FIG. 3, a first measured time period between S and misplaced N appears too long, and a second subsequent measure time period between misplaced N and S appears too short). As has been shown, this oscillation error is simply a reflection of the difference in time measurement between successive poles passing a given sensor 212. The inventors have noted that, as the numbers of poles increase the oscillation errors will increase, as there will be more instances for up and down motion of the time measurement between passing poles.

One advantage of the subject matter disclosed herein is that it tends to overcome measurement errors that occur due to misalignment of poles. In one embodiment, this is accomplished by taking what is referred to herein as a moving average over a whole motor rotation in order to determine the speed.

Figure 4:
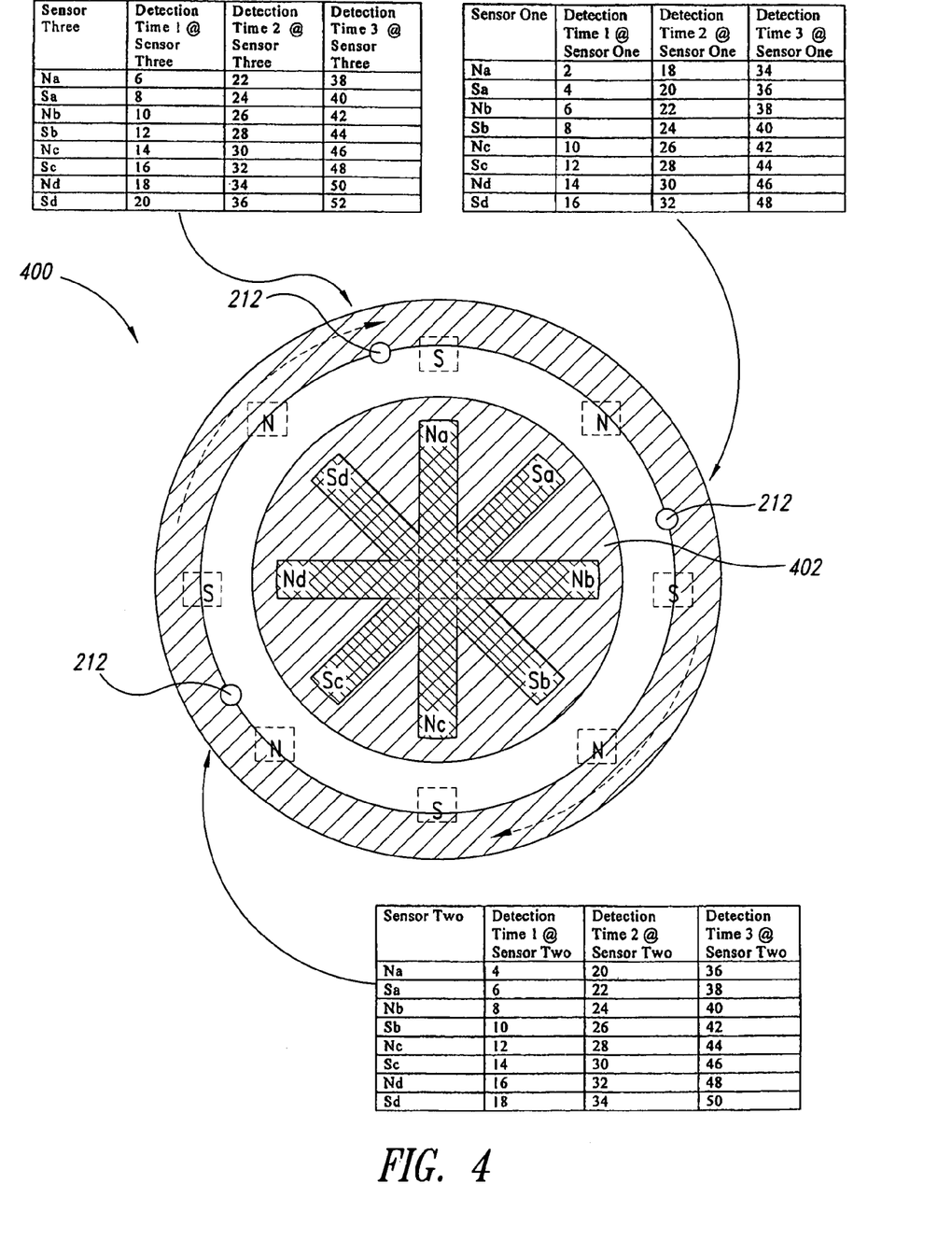
FIG. 4 shows motor 400 having three magnetic pole position sensors 212 and a four pole pair magnet (e.g., 8 pole) rotor 402.

FIG. 4 shows a motor 400 having three magnetic pole position sensors 212 and a four pole pair magnet (e.g., 8-pole) rotor 402. As the 8-pole magnet makes one complete rotation, each sensor 212 detects, at certain elapsed times, the passing of either North or South poles as illustrated via the measurement tables (designated sensor one, sensor two, and sensor three tables). There are thus twenty-four time measurements per revolution for the four pole pair magnet rotor 402. The three magnetic pole position sensors are each aligned with stator windings, detecting each north (rise) and south (fall) as they pass by the pole sensors. Accordingly, as shown in FIG. 4, in one revolution there are twenty-four North or South pole passings detected (e.g., three sensors times the four pole pairs or 8 poles, or twenty-four edges).

Each one of those measurements is a measurement of the last complete revolution indexed by one pole. Every time there is a new pole passing, a new measurement is taken and averaged with the other twenty-three previous measurements, providing a continuous moving average speed of the motor.

As noted above, a method of taking measurements is to measure the time difference from one pole passing event to the next pole passing event, regardless of whether it is on the same sensor or same magnetic pole. This often results in a ripple effect due to the misalignments or non-uniformity of the pole placement of the permanent magnet pole. As taught herein, any pole misalignment can be eliminated from the speed measurement by taking a moving average over a whole motor revolution (e.g., N rising to rising measurements in a pulsed signal). At an edge of each pulse resulting from the passing of a pole by the sensor 212, an average is taken over the last complete revolution from that edge. In one embodiment, the moving average is calculated based on saved data reflecting a previous rotation. In another embodiment, the moving average is calculated by detecting the time of every edge or pulse received and counting the received edges or pulses so that the present passing event can be compared against the last rotation.

As will be apparent in relation to the scheme shown and described in relation to FIG. 5 below, for an 8 pole motor such as that shown in FIG. 4, the described scheme may result in twenty-four measurement calculations per revolution for a four pole pair magnet with three magnetic pole position sensors. Accordingly, reliable data rate is provided and no time lag occurs in the case of a big change in the rate of speed. This can be considered optimal in that it offers the lowest time delay for completely rejecting the error due to misalignment of the poles if the moving average is recalculated each time a new rising edge is detected in the pulsed signal.

The general beneficial effects described above apply generally to each of the exemplary descriptions and characterizations of the devices and mechanisms disclosed herein. The specific structures through which these benefits are delivered will be described in detail herein below.

According to one implementation of the subject matter disclosed herein, the measurement from each revolution is retained yet updated every revolution. This provides a high rate measurement that is accurate since it is taken over one complete revolution. In the conventional method of measuring speed, variations in the speed measurement occur due to the imperfection in the location of the transition from the north to south pole. However, by averaging the previous revolution, this problem of varying speed measurement is overcome. This concept is further illustrated in relation to FIG. 5.

Figure 5:
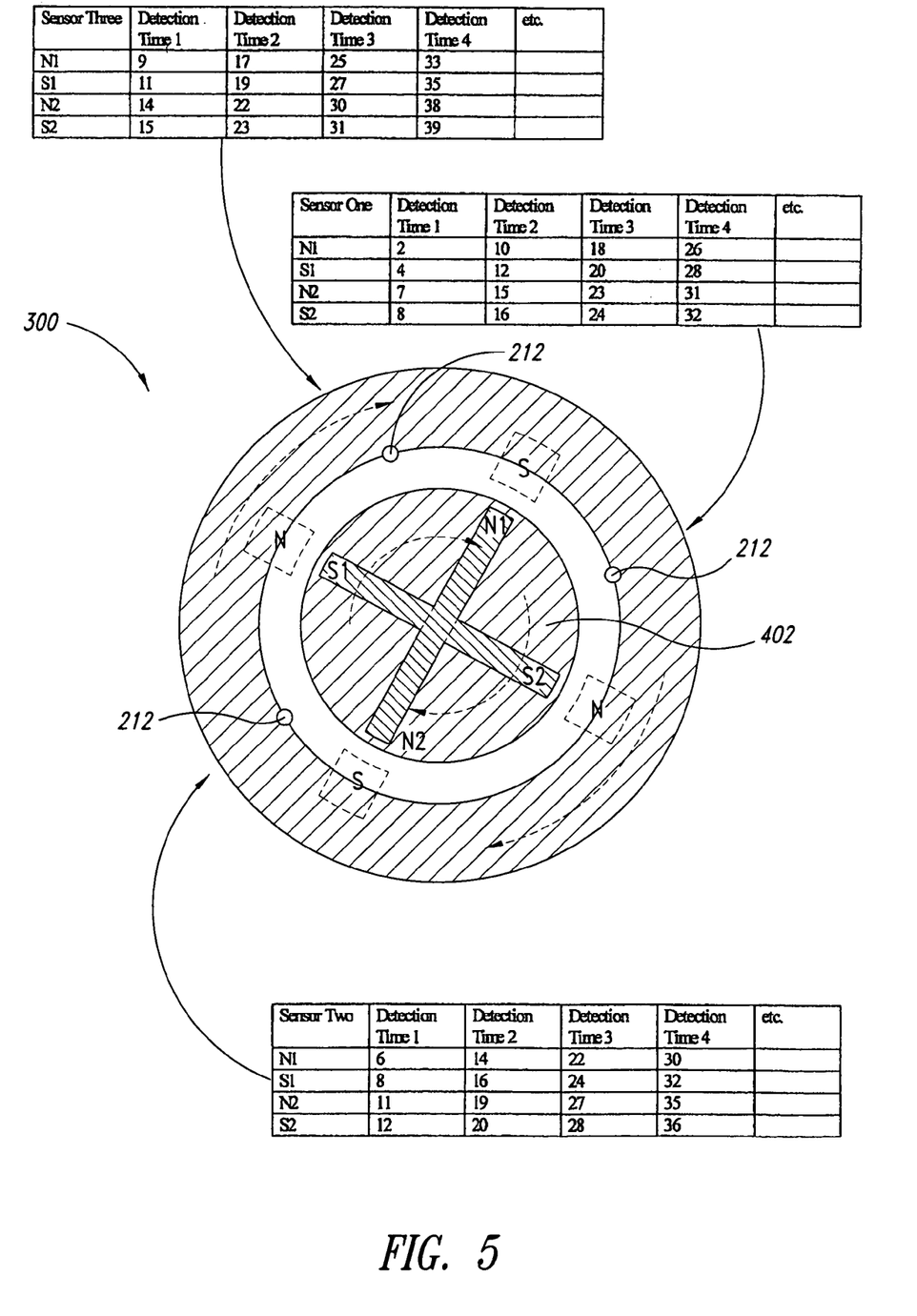
FIG. 5 shows the four pole machine 300 of FIG. 3 where the rotor poles are not equispaced (e.g., due to tolerance and/or errors during manufacturing) in conjunction with measurement tables designated sensor one, sensor two, and sensor three tables.

FIG. 5 shows the four pole machine 300 of FIG. 3, where the rotor poles are not equispaced (e.g., due to tolerance and/or manufacturing errors). Further shown in FIG. 5 are measurement tables designated sensor one, sensor two, and sensor three tables. Each sensor 212 detects, at certain elapsed times, the passing of either North or South poles as the four pole magnet makes one complete rotation. There are thus 12 elapsed time measurements per revolution.

Misplacement of N2 from the intended equispaced position produces an apparent lag with respect to the preceding pole S1 in the direction of rotation, and an apparent lead with respect to the succeeding pole S2. This apparent lag and lead is represented in the measurement tables. The misplacement of magnetic poles is difficult to detect, except as "oscillations" in measurements. In addition, insofar as that, absent the subject matter of the present application, such oscillations tend to be indistinguishable from the motor slowing down and speeding up, the inventors have discovered that in the related art such oscillations create significant measurement and control difficulties.

As has been noted, the foregoing oscillation problem can be alleviated by use of one or more moving averages of sensor speed based on a complete physical rotation.

Once a specific magnetic pole of the rotor 202 of FIG. 5 has completed one rotation relative to one of the sensors, it is possible to construct an average of the elapsed time of physical rotation of the specific magnetic pole over one physical rotation. In one embodiment, this is achieved by using one near-real time measurement of an elapsed time of the specific pole, plus previously measured elapsed times between other poles to allow historical reconstruction of the previous complete mechanical revolution of the rotor. Thereafter, an average time of physical rotation of the specific magnetic pole over the historical reconstruction is calculated. Subsequently, the calculated average time of physical rotation is utilized to calculate a rotational quantity (e.g., speed), thereby eliminating any measurement errors due to misplaced poles.

There are many other ways to apply this moving average idea. For example, a permanent magnet motor typically has three magnetic pole position sensors for commutation. If there are N pole pairs and one can make multiple simultaneous measurements, it is possible to get 3*N*2 speed measurements per revolution (three sensors, N pole pairs, and each of the rising and falling edges of each north and south pole). Similarly, one can perform moving averages on each sensor, giving a new moving average speed 3*N*2 times per revolution. This is illustrated in FIG. 1 for a four pole permanent magnet having three Hall sensors.

Figure 1:
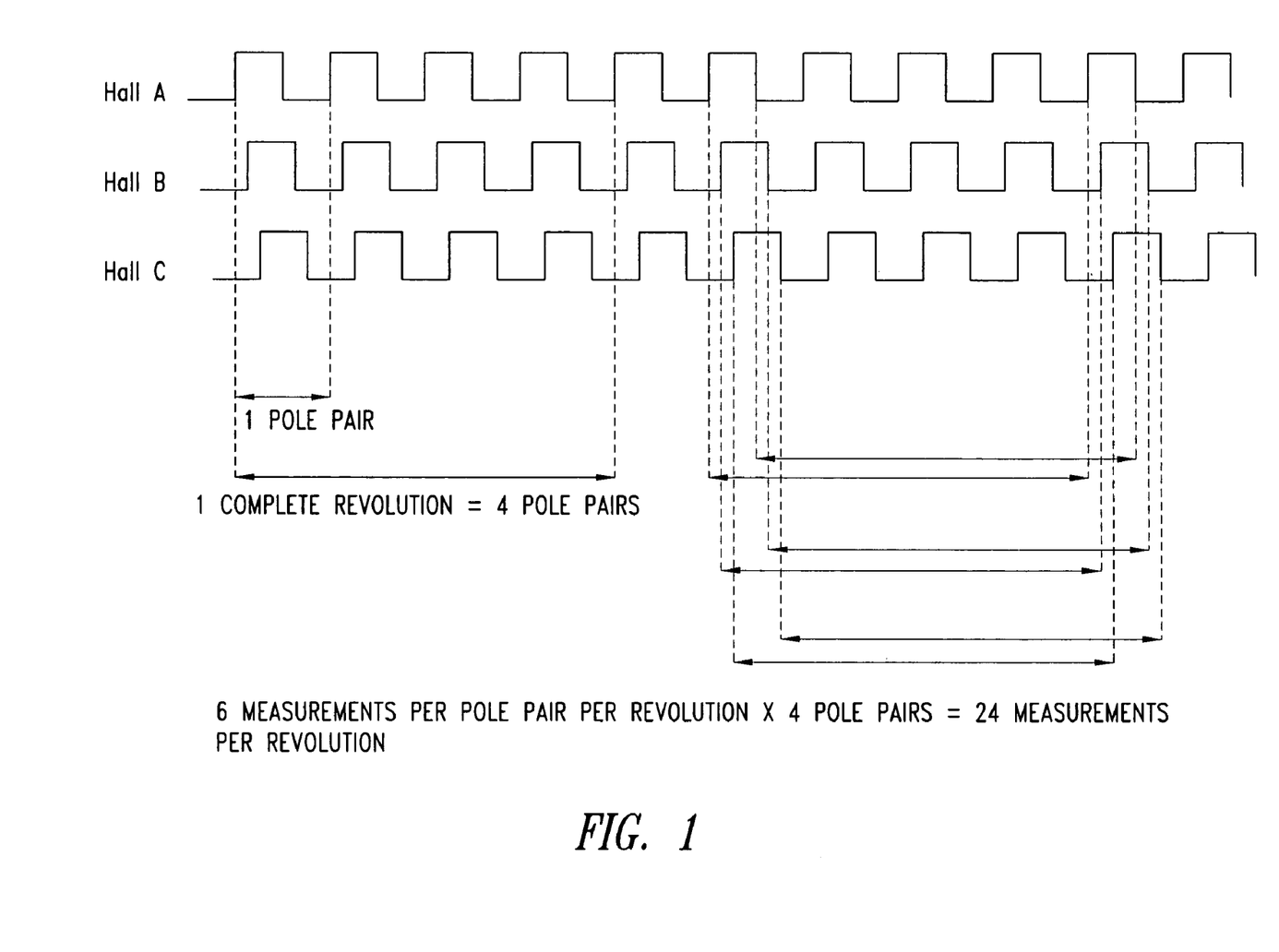
FIG. 1 is an illustration of the variation in oscillation between pole pairs for a motor having three Hall effect sensors and four pole pairs.

FIG. 1 shows time measurement waveforms (i.e., pulsed signals) arising from three magnetic pole sensors (e.g., Hall Effect sensors), where each upwards going or downwards going edge represents a detected North or South pole. The time measurement waveforms can be used to determine pole pair detection by "bracketing" upwards and downwards transitions. Such bracketing may be used to determine one complete revolution of four pole pairs (or 8 poles) (e.g., as shown and discussed in relation to FIG. 4). Such bracketing may be used with the three different Hall effect sensors to obtain 24 measurements per revolution of a four pole pair (8 pole) rotor.

By utilizing measurement techniques such as those shown in FIG. 1, the speed of the motor can be more accurately regulated. Specifically, in one implementation of the subject matter disclosed herein ΔT is divided by one whole revolution, thereby smoothing out the oscillations. Accordingly, each ΔT measurement can be updated. Thereafter, the frequency F is instantaneously updated each time a ΔT is received, such that the frequency is the inverse of the number of magnetic pole position sensors times the ΣΔT.

Figure 6:
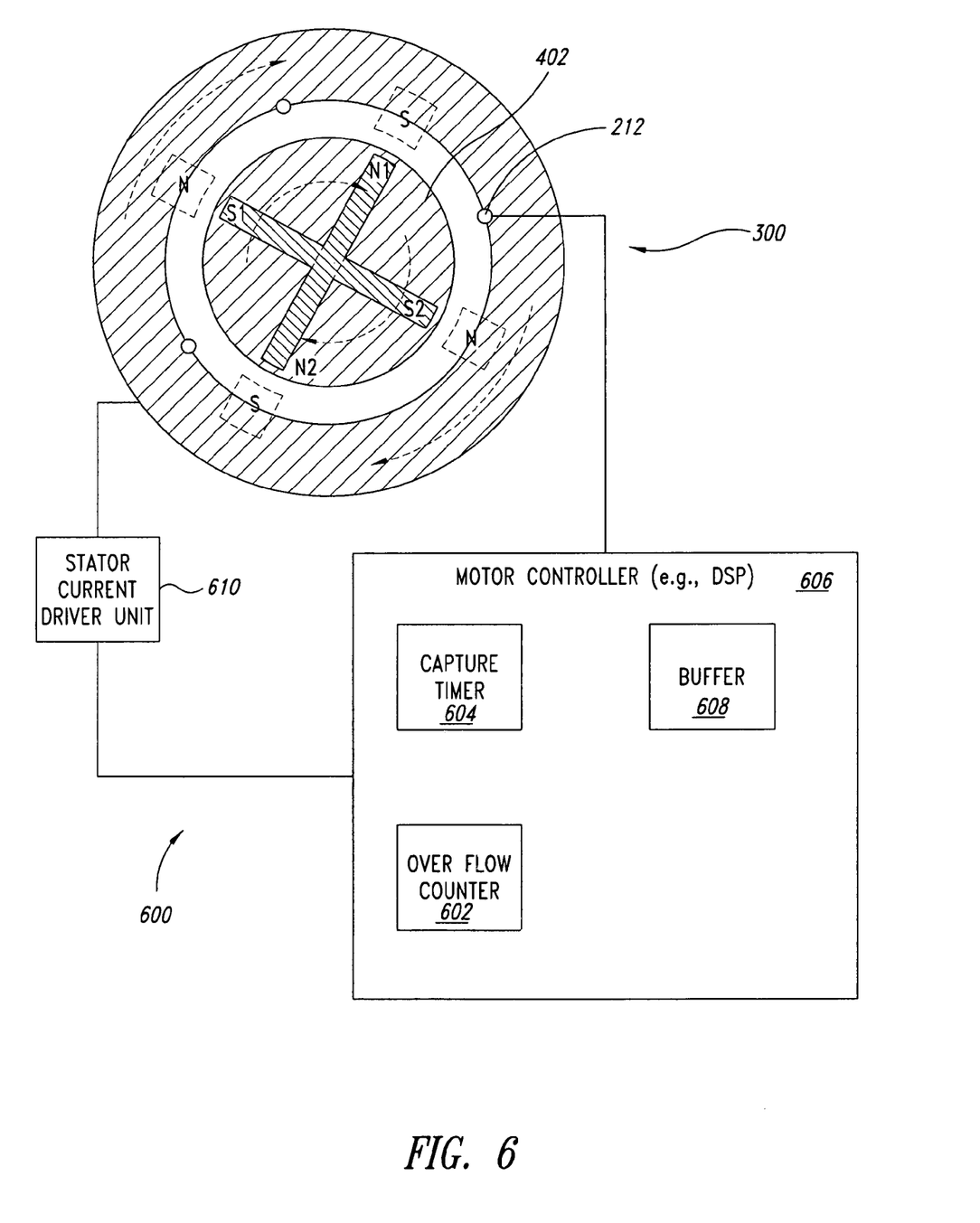
FIG. 6 illustrated is a system 600 implementing various of the techniques described herein.

FIG. 6 shows system 600 implementing various of the techniques and devices described herein. Motor controller 606 provides a measured motor speed value in some unit such as RPM, averaged over the last one complete revolution, to stator current driver unit 610 (e.g., a speed regulator).

In one embodiment, a speed timer overflow counter 602 is provided that is initially set to zero in order to calculate the motor speed value from one magnetic pole position sensor 212. A capture timer 604 counts the number of clock ticks, or time measurements, between rising and falling edges corresponding to the passing of the poles in the pulsed signal waveform Because the capture timer 604 is generally limited in resolution, the timer size may be increased in order to provide an acceptable minimum detectable speed while maintaining reasonable resolution at high speed. The timer overflow counter 602 provides this extension of the size of the capture timer. For example, where the capture timer 604 is a sixteen-bit timer having a range of 0–65535, if the overflow counter 602 is of appropriate size the overflow counter 602 can provide an additional, or upper, sixteen bits to this counter, thereby extending the timer size to 65536*2. Every time the timer 604 overflows, the overflow counter 602 is incremented. The overflow counter 602 is zeroed or cleared when a new value is latched by a capture unit of the capture timer 604. All of this functionality may be accomplished within a motor controller 606 such as a digital signal processor.

As has been illustrated in relation to FIG. 5, in one implementation the number of time measurements added together to calculate the average speed over one revolution is equal to the number of north-south pole sets. For example, for a ten pole motor five time measurements, i.e., the time from one rising edge to the next, will be added together in order to calculate the average speed over one revolution. In measuring times using system 600, when the timer 604 overflows, the overflow counter 602 is incremented. The overflow counter 602 is cleared when a new value is latched by a capture unit, i.e., after the overflow has been read.

Once a rising edge is detected, the capture timer or unit 604 begins counting the number of clock ticks until the next rising edge. The overflow value is multiplied by a constant based upon the size of the extended timer. For a sixteen-bit timer, this constant would be 216, or 65536. This overflow value is then added with the number of ticks counted by the clock timer from one rising edge to the next, and the result is placed in a circular buffer 608. The index to the next position in the circular buffer is then updated, providing a raw speed value, or array of the last five measurements (for the example of a ten pole motor) of the number of clock ticks between the rising edges associated with the passing of poles, as determined by the magnetic pole position sensor 212. This raw speed value array is added together and inverted, with the result multiplied by the number of clock ticks of the timer between rising edges of the poles. The resultant value is the measured motor speed in some unit such as RPM, averaged over the last one revolution.

Accordingly, an apparatus may be provided for determining the averaged motor speed wherein the apparatus is comprised of a timer 604 for measuring the time between the rising edges of one pulse and the next, an overflow counter 602 for extending the size of the timer, a buffer 608 for storing the number of ticks and overflow value, at least one magnetic pole position sensor 212 for capturing the rising edge of each pulse, or measure each full magnetic field vector, and a brushless permanent magnet motor 300 having at least two pole pairs. Any one or more of the timer, counter and buffer elements may be found in a controller such as a digital signal processor 606.

As the motor 300 begins to rotate, the magnetic pole position sensor 212 provides a pulse in response to the passing of a magnetic pole, triggering the timer 604 to begin counting until the next rising edge of a pulse. When the timer overflows, the overflow counter 602 is incremented. The maximum value of the counter should be less than the maximum size of the extended timer divided by the number of poles. This is because the number of time measurements added together to calculate average speed over one revolution should preferably be less than the size of the extended timer. In this scheme, the total number of time measurements is equal to one half of the total number of poles.

When the next rising edge of a pulse is detected, an interrupt occurs whereby the number of clock ticks by the timer is captured. The value or number of overflows stored in the counter is multiplied by the maximum size of the extended counter, e.g., for a sixteen bit timer, this value would be 65536, and the result is added to the number of clock ticks captured giving the total clock ticks from one rising pulse edge to the next.

This total clock ticks value is placed in a circular buffer, wherein an index is updated. The index is in the form of an array having a continuously updated time measurement for each edge-to-edge measurement. Each of the time measurements are added together, giving a total number of clock ticks in one revolution of the motor. The value of the total number of clock ticks is then inverted and multiplied by the number of ticks by the timer over a prescribed period of time, typically a second, resulting in the averaged motor speed over one revolution of the motor, or frequency. This frequency can be expressed in units such as revolutions per minute, or RPM. As new pole-to-pole measurements are provided, the buffer, and therefore the speed, is continually updated. By such an apparatus and method, an acceptable substantially minimum detectable speed is provided by stator current driver unit 610 via conventional techniques while maintaining reasonable resolution at high speed. Further, by such an apparatus and method, an improvement in speed measurement quality for multi-pole machines is provided.

Figure 7:
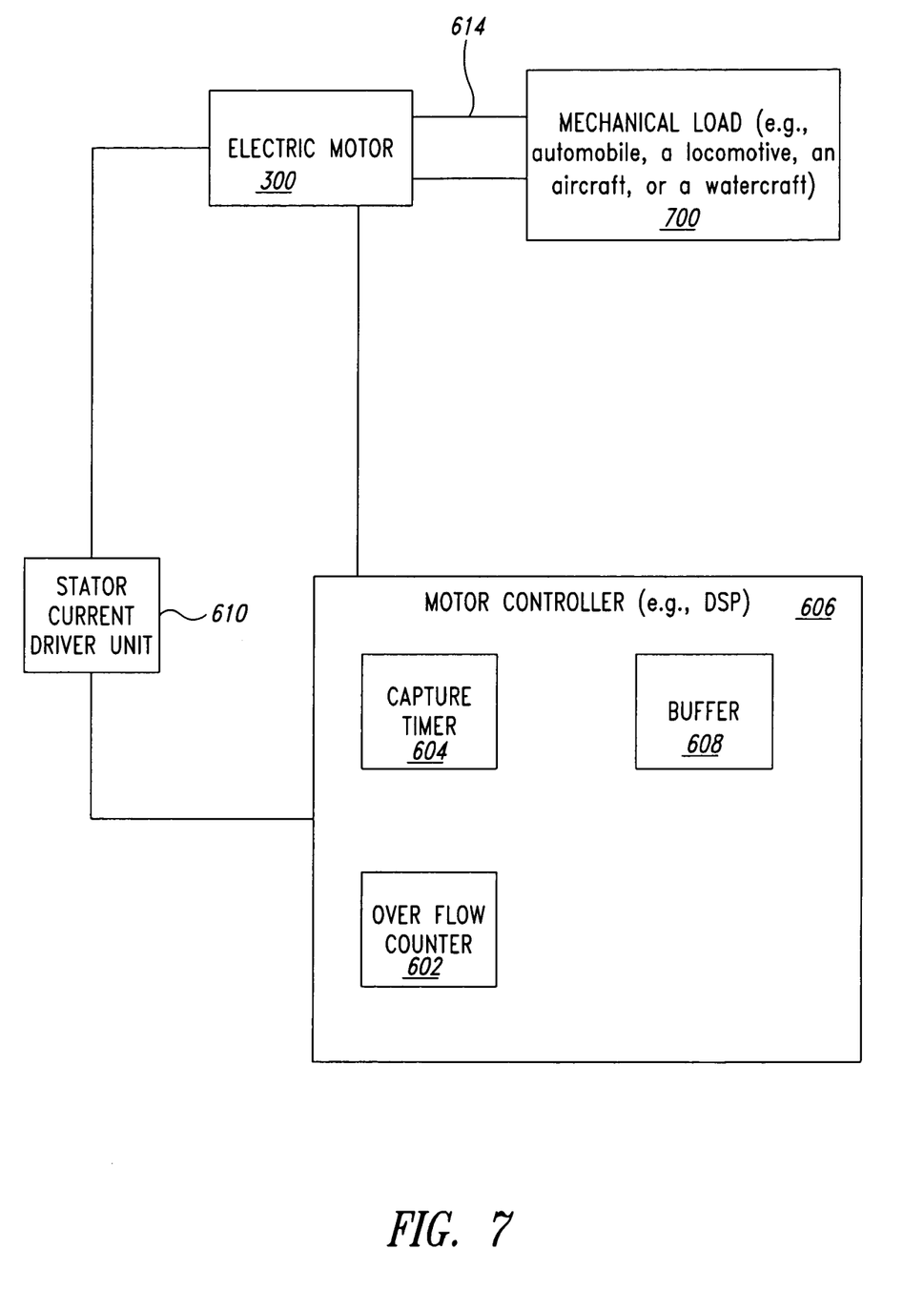
FIG. 7 shows the system of FIG. 6 operably coupled to drive a mechanical load 612.

FIG. 7 shows the system of FIG. 6 operably coupled to drive a mechanical load 700. Mechanical load 700 may be substantially any type of load driven which can be driven by an electric motor, such as an automobile, a locomotive, an aircraft, or a watercraft. Electric motor 300 is coupled to mechanical load 700 by operable coupling 614. Operable coupling 614 may encompass substantially coupling devices used by those having ordinary skill in the art, such as mechanical and/or electrical and/or hydraulic mechanisms, or combinations thereof.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety including, but not limited to, U.S. Ser. No. 60/319,066, filed Jan. 16, 2002.

Those having ordinary skill in the art will recognize that the state of the art has progressed to the point where there is little distinction left between hardware and software implementations of aspects of systems; the use of hardware or software is generally (but not always) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electric equipment).

Those skilled in the art will recognize that it is common within the art to describe devices and/or processes in the fashion set forth herein, and thereafter use standard engineering practices to integrate such described devices and/or processes into systems.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. it will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A method for use with a multi-pole machine, said method comprising:
    detecting a first time at which a first pole passes a first stator position;
    detecting a second time at which a second pole passes the first stator position;
    determining an elapsed time between the first and the second times;
    recalling at least one historical elapsed time between the first and the second poles passing the first stator position;
    calculating an average time based on the elapsed time and the at least one historical elapsed time; and
    calculating a rotational quantity on the basis of the average time.

2. The method of claim 1, wherein calculating a rotational quantity on the basis of the average comprises:
    multiplying the average time by a number of poles.

3. The method of claim 1, wherein the rotational quantity comprises at least one of an angular velocity and an angular acceleration.

4. The method of claim 1 wherein said detecting a first time at which a first pole passes a first stator position comprises:
    staffing a count upon detection of a first polarity pole by a first sensor held stationary relative to a stator.

5. The method of claim 1 wherein said detecting a second time at which a second pole passes the first stator position comprises:
    stopping a count upon detection of a second polarity pole by the first sensor held stationary relative to a stator.

6. The method of claim 1 wherein said recalling at least one historical elapsed time between the first and the second poles passing the first stator position comprises:
    recalling a number of historical elapsed times between the first and the second poles passing the first stator position sufficient to constitute at least a part of one mechanical rotation of a rotor.

7. The method of claim 1 further comprising:
    controlling an electric motor responsive to the rotational quantity.

8. A multi-pole machine system, said system comprising:
    means for detecting a first time at which a first pole passes a first stator position and a second time at which a second pole passes the first stator position;
    means for determining an elapsed time between the first and the second times;
    means for recalling at least one historical elapsed time between the first and the second poles passing the first stator position;
    means for calculating an average time based on the elapsed time and the at least one historical elapsed time; and
    means for calculating a rotational quantity on the basis of the average time.

9. The system of claim 8, wherein said means for calculating a rotational quantity on the basis of the average time comprises:
    means for multiplying the average time by a number of poles.

10. The system of claim 8, wherein the rotational quantity comprises revolutions per unit time.

11. The system of claim 8 wherein said means for detecting a first time at which a first pole passes a first stator position and a second time at which a second pole passes the first stator position comprises:
    means for starting a count upon detection of a first polarity pole by a first sensor held stationary relative to a stator.

12. The system of claim 8 wherein said means for detecting a first time at which a first pole passes a first stator position and a second time at which a second pole passes the first stator position comprises:
    means for stopping a count upon detection, by a first sensor held stationary relative to a stator, of a second polarity pole.

13. The system of claim 8 wherein said means for recalling at least one historical elapsed time between the first and the second poles passing the first stator position comprises:
    means for recalling a number of historical elapsed times between the first and the second poles passing the first stator position sufficient to constitute at least a part of one mechanical rotation of a rotor.

14. The system of claim 8 further comprising:
    means for controlling an electric motor responsive to the rotational quantity.

15. The system of claim 14 further comprising:
    an electric motor operably coupled to said means for controlling the electric motor; and
    at least one of an automobile, a locomotive, an aircraft, and a watercraft operably coupled to said electric motor.

16. An apparatus for determining a speed of a multi-pole motor, the apparatus comprising:
    at least one magnetic pole position sensor positioned to detect a passing of each pole and configured to provide a pulse in a pulsed signal in response to each passing of each pole; and
    a controller for measuring a time between a rising edge of one pulse and a rising edge of a next pulse in the pulsed signal and storing a total time in one revolution of the motor, the controller comprising a buffer for storing substantially all time values measured from pulse to pulse.

17. The apparatus of claim 16 wherein the controller is further comprised of a timer for measuring the time between the rising edges of one pulse and the next pulse.

18. The apparatus of claim 16 wherein the controller further comprises an overflow counter for extending a size of a timer.

19. The apparatus of claim 16 wherein a sum total of all time values measured and stored in the buffer is substantially equivalent to a time to complete one revolution of the motor.

20. The apparatus of claim 19 further comprising means for calculating a moving average speed measurement of the motor by inverting the sum total of all time values measured and multiplying a result of the inverting by a number of ticks of a timer over a prescribed period of time, thereby providing a motor frequency.

21. The apparatus of claim 16 further comprising:
    an electric motor operably coupled to said controller and said at least one magnetic pole position sensor; and
    at least one of an automobile, a locomotive, an aircraft, and a watercraft operably coupled to said electric motor.

22. The apparatus of claim 16 wherein the measured time between the rising edge of one pulse and the rising edge of the next pulse comprises a determined elapsed time, the controller being adapted to recall at least one historical elapsed time and to calculate an average time based on the determined elapsed time and the recalled at least one historical elapsed time, the average time being usable by the controller to determine a moving average speed of the motor.

23. A system for measuring speed of a rotor having N magnetic poles, N an even integer greater than or equal to 2, the system comprising:

a magnetic pole position sensor configured to generate a pulsed signal comprising a plurality of pulses, each pulse of the plurality of pulses generated every time a magnetic pole of the N magnetic poles passes by the magnetic pole position sensor; and a controller coupled to the magnetic pole position sensor, the controller configured to determine a plurality of intervals between a plurality of pulse edges of consecutive pulses and to compute a moving average speed of the rotor based upon the plurality of intervals.

24. The system of claim 23, wherein the controller is further configured to compute the moving average speed of the rotor N/2 times per revolution of the rotor, each computation of the moving average speed based upon N/2 intervals measured between N/2+1 consecutive pulse edges having a same direction of change, the controller further comprising a buffer for storing the N/2 intervals.

25. The system of claim 24, wherein the N/2+1 consecutive pulse edges having a same direction of change are N/2+1 consecutive rising pulse edges.

26. The system of claim 24, wherein the N/2+1 consecutive pulse edges having a same direction of change are N/2+1 consecutive falling pulse edges.

27. The system of claim 24, wherein the controller is further configured to update the buffer N/2 times per revolution of the rotor.

28. The system of claim 27, wherein upon each update of the buffer, the buffer is configured to store the N/2 intervals, the N/2 intervals being most recently measured and comprising one complete revolution of the rotor.

29. The system of claim 23, wherein the controller is further configured to compute the moving average speed of the rotor N times per revolution of the rotor, each computation of the moving average speed based upon N intervals measured between N+1 consecutive pulse edges, the controller further comprising a buffer for storing the N intervals.

30. The system of claim 29, wherein the controller is further configured to update the buffer N times per revolution of the rotor.

31. The system of claim 30, wherein upon each update of the buffer, the buffer is configured to store the N intervals, the N intervals being most recently measured and comprising one complete revolution of the rotor.

32. The system of claim 23, wherein the controller further comprises:

a capture timer configured to determine the plurality of intervals; and a buffer configured to store the plurality of intervals, a sum of the plurality of intervals equal to a revolution time of the rotor.

33. A method for measuring speed of a multi-pole electric machine, the method comprising:

generating a pulsed signal comprising a plurality of pulses, a pulse of the plurality of pulses generated each time a magnetic pole of a N-pole rotor passes by a magnetic pole position sensor, the plurality of pulses having a plurality of pulse edges, and N an even integer greater than or equal to 2;

determining a plurality of intervals between the plurality of pulse edges of consecutive pulses; and determining a moving average speed of the N-pole rotor based upon the plurality of intervals.

34. The method of claim 33, wherein determining the moving average speed further comprises determining the moving average speed N/2 times per revolution of the N-pole rotor, each determination of the moving average speed based upon N/2 intervals measured between N/2+1 consecutive rising pulse edges.

35. The method of claim 33, wherein determining the moving average speed further comprises determining the moving average speed N/2 times per revolution of the N-pole rotor, each determination of the moving average speed based upon N/2 intervals measured between N/2+1 consecutive falling pulse edges.

36. The method of claim 33, wherein determining the moving average speed further comprises determining the moving average speed N times per revolution of the N-pole rotor, each determination of the moving average speed based upon N intervals measured between N+1 consecutive pulse edges.

37. The method of claim 33, further comprising generating at least one other pulsed signal comprising a plurality of other pulses, a pulse of the plurality of other pulses generated each time a magnetic pole of the N-pole rotor passes by at least one other magnetic pole position sensor, the plurality of other pulses having a plurality of other pulse edges, and wherein determining the plurality of intervals further comprises determining the plurality of intervals between the plurality of pulse edges and between the plurality of other pulse edges.

* * * * *